June 29, 1965    M. DE VALERA KIERANS    3,191,306
COMBINATION COMPASS-CLINOMETER AND HAND LEVEL
Filed March 18, 1963
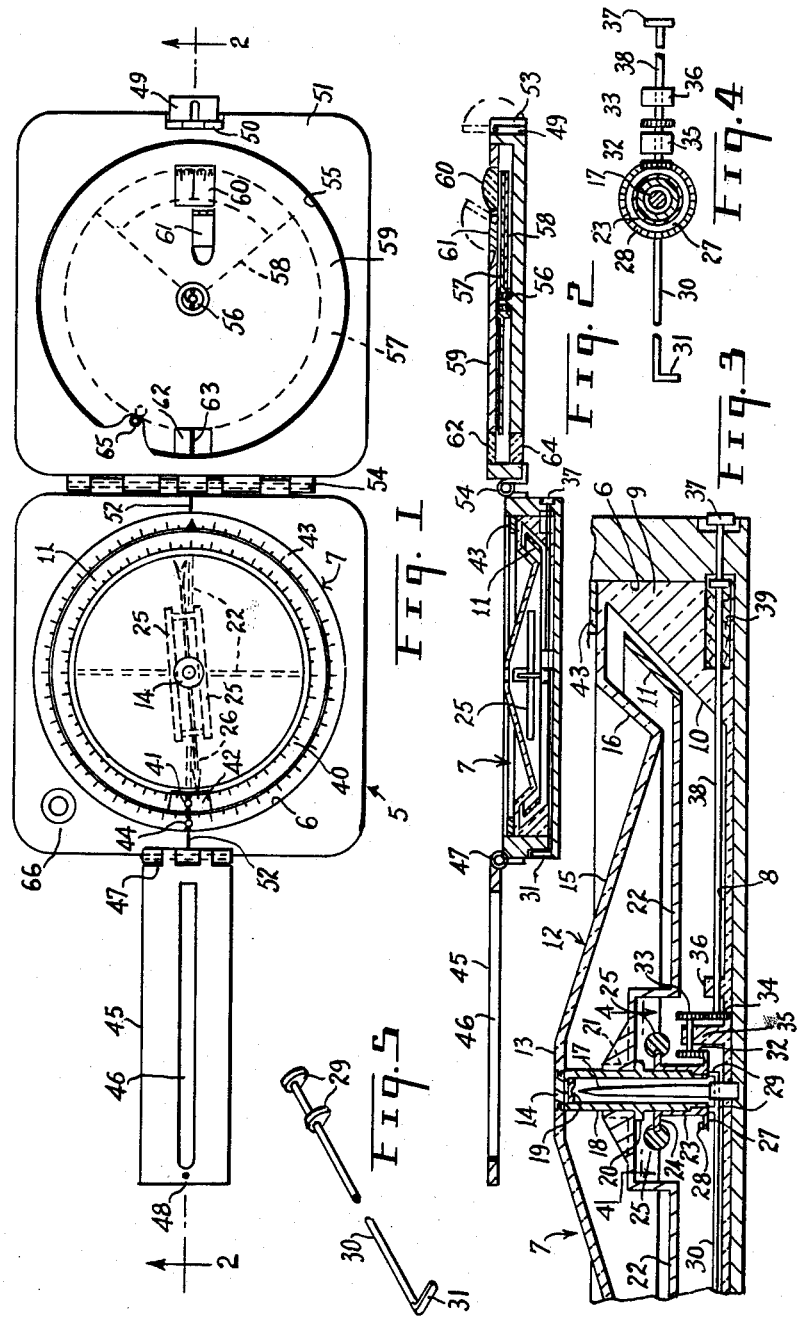
INVENTOR.
BY    M. D. KIERANS
Fetherstonhaugh & Co.
ATTORNEYS

United States Patent Office 3,191,306
Patented June 29, 1965

3,191,306
COMBINATION COMPASS-CLINOMETER
AND HAND LEVEL
Martin De Valera Kierans, 345 Hennessy St.,
Bathurst, New Brunswick, Canada
Filed Mar. 18, 1963, Ser. No. 265,645
9 Claims. (Cl. 33—72)

This invention relates to pocket type compasses and particularly to a liquid-damped type of pocket compass which includes means to adjust the magnet system relative to the compass dial and also including in the cover of the compass case, a weight type clinometer.

The invention consists essentially of a compass case within which is set a liquid tight case and which includes a rotatable compass dial and a magnet system together with means to rotate the magnet system relative to the compass dial for the purpose of adjusting for magnetic declination and to obtain a true bearing, and with means to raise and lower the compass dial and magnet system on and off its pivot point. The cover which is hinged to the compass case has its inner face recessed to receive a weight type clinometer complete with suitable reading window and a sighting window through the cover for eye-level bearing determinations. The compass assembly is complete with a forward sight hinged to the compass case and a rear sight hinged to the case cover.

This invention combines in one instrument the usefulness of a Brunton-type pocket transit-compass-clinometer and the Silva-type Forestry liquid-damped compass and can be used with or without a tripod. The present invention makes it possible to determine bearings and inclinations much faster and with greater accuracy than is possible with presently known liquid-damped instruments of the hand type, and is particularly useful for non-technical operators.

The disadvantages of the Brunton-type compass are: (a) that the air-damped needle takes a long time to come to rest, increasing reading time and chances of erroneous readings, (b) it is possible that in error the wrong end of the needle will be read, (c) numbers must be read upside down, in certain positions, thereby increasing time for reading and increasing chances of error in reading, (d) the bubble type clinometer is slow and clumsy in use for determinations of inclinations or "dips," and (e) the instrument is almost useless at night.

The disadvantages of the Silva-type compass are that it lacks a clinometer and so is useless for the geologist or for carrying detailed compass traverse lines in hilly terrain. Also the Silva-type compass can be used for following a set bearing but, only with difficulty, can it be used for actually determining an unknown bearing to an object.

The present invention eliminates all of the above disadvantages of both the Brunton-type and Silva-type compasses. It is not intended to be as accurate as the Brunton-type compass. However, for underground or surface geological mapping when great numbers of "strikes" (bearings) and "dips" (inclinations) of geological features are taken, the instrument hereinafter described should be superior to the Brunton-type compass.

The object of the invention is to provide in one instrument a liquid-damped compass and a clinometer which can be used to follow a predetermined course or bearing and be used with accuracy by non-technically trained persons.

A further object of the invention is to provide a hand compass which is liquid-damped and includes means for adjustment of the magnet assembly relating to the compass dial in order to off-set the dial relative to the magnet for reading a true bearing rather than a magnetic bearing.

A further object of the invention is to provide an instrument by which it is possible to determine inclinations of planes or dips of geological features.

A further object of the invention is to provide an instrument by which it is possible to determine horizontal or vertical angles of lines of sight.

A further object of the invention is to provide a compass in which various types of readings can be taken rapidly and with a high degree of accuracy because the bearing shown on the rotatable compass dial is read directly in front of the operator and at a convenient reading attitude.

These and other objects of the invention will be apparent from the following detailed description and accompanying drawings, in which:

FIG. 1 is a plan view of the combined compass and clinometer when the instrument is opened out.

FIG. 2 is a vertical longitudinal section on the line 2—2 of FIG. 1.

FIG. 3 is an enlarged partial section of the compass portion of the instrument shown in FIG. 2.

FIG. 4 is a horizontal section on the line 4—4 of FIG. 3.

FIG. 5 is a perspective view of the compass dial elevating cam means.

Referring to the drawings, the compass case 5 is made of any suitable non-magnetic material such as aluminum, magnesium or plastic, and is provided with a circular recess 6 to receive the liquid-tight compass container 7. The circular container 7 is hollow and preferably made of transparent material such as clear plastic and is initially made in two sections suitably bonded together after the compass elements have been fitted in place within it, the container then being filled with a compass dampening liquid and sealed.

The bottom wall 8 and side wall 9 of the container 7 are a snug fit in the recess 6 of the case 5. The inner surface 10 of the side wall 9 is tapered upwardly and outwardly from the bottom wall 8 as shown particularly in FIGS. 2 and 3, and the angle of the surface 10 is complementary to that of the angled compass dial 11. The top wall 12 of the container has a central horizontally disposed portion 13 in which is embedded the friction disc 14. The top wall 12 radiates outwardly and downwardly in the form of a shallow cone 15 and is then diverted upwardly and outwardly at 16, parallel with and spaced a short distance radially inwards of the compass dial 11, and is then extended horizontally to meet the upper periphery of the side wall 9.

The compass dial assembly includes the compass dial 11, a pivot point 17 supported vertically in the bottom of the container 7. A cylindrical sleeve 18 of non-magnetic material co-axial with the pivot point 17 carries at its upper end the jewel pivot 19 for the rotating assembly of the compass. A collar 20, midway of the height of the cylindrical sleeve 18 supports in turn a sleeve 21 from which the dial support arms 22 radiate to support at their outer ends, the compass dial 11.

A sleeve 23 in friction contact with the outer surface of the sleeve 18 below the collar 20 has a pair of arms 24 projecting radially opposite therefrom to support the pair of bar magnets 25 disposed on either side of the pivot assembly as particularly shown in FIGS. 1 and 3. A pointer 26 is mounted on the magnet assembly and centrally located relative to the pair of bar magnets 25. The lower end of the sleeve 23 is in the form of a flange 27 disposed in a plane at right angles to the axis of the sleeve and carries the ring gear 28.

The floating compass assembly, including the compass dial 11, support arms 22, sleeve 18 and bar magnet assembly are raised and lowered by means of the pair of cams 28 secured on the inner end of the rod 30, the cams 29 being disposed under the lower end of the sleeve 18. The rod 30 extends through the side wall 9 of the container 7 and through the side wall of the compass case 5 and is provided with a handle 31 by means of which the cams 29 can be rotated to raise and lower the compass magnet and dial assembly.

A gear train consisting of the gears 32, 33 and 34 is mounted in suitable bearings 35 and 36 in the bottom of the container 7, and the gear train is rotated by means of the wheel 37 on the outer end of the rod 38 connecting the wheel 37 with the gear 34. The purpose of the additional gears 33 and 34 is to lower the location of the rod 38 so as not to strike the dial 11 when the dial oscillates about a vertical axis on its pivot 17 when the compass assembly is lowered. Suitable packing 39 seals the rods 30 and 38 in the side wall 9 of the container 7 against leakage of liquid from the container 7.

The compass dial 11 may be graduated as at 40 and has a North point or zero degree marking 41 indicated thereon. The graduations 40 on the compass dial may be graduated in the quadrant or azimuth systems. In the azimuth system marking there is an additional set of degree marks above the azimuth marking from zero degrees to 180° for reading reciprocal bearings or strike bearings over 180°. A combined magnifying glass 42 with a reading line is mounted on the face of the compass dial immediately over the North or zero mark 41.

A rotatable ring 43, friction stopped, is mounted on the compass case at the periphery of the container 7 and is marked off in degrees and is provided with a luminous North point 44 which, when co-linear with the luminous zero or North point 42 on the compass dial 11 (by turning the compass) sets the compass to the desired orientation.

A front sighting vane 45 having an aperture 46 is hinged at 47 to the compass case 5 and is provided with a luminius spot 48 which gives an approximate bearing for night traversing. A rear sighting vane 49 is hinged at 50 to the clinometer case 51 and in alignment with the front sighting vane 45. The front and rear sights 45 and 49 are aligned with a central axis mark 52 on the face of the compass case 5. The rear sighting vane 49 in the closed position of the compass is folded down into the recess 53 in the edge of the cover 51.

The clinometer case 51 is hinged to the compass case 5 at 54 and has a circular recess 55 in its face opposing the compass and has a ball bearing pivot 56 on which a clinometer card 57 is mounted. A weight sector 58 is secured to the underside of the clinometer card 57. The clinometer card 57 is graduated in degrees in the usual well known manner. A scribed mirror 59 is set in the case 51 above the clinometer card 57 and is provided with an inclination reading window 60 in the form of a magnifying lens. A hinged section of mirror 61 is set into the surface of the mirror 59.

A sighting window 62 with a scribed sighting line 63 is set into the mirror 59 and is aligned with a simlar window 64 in the opposite face of the case 51.

A push button release clamp 65 holds the clinometer card 57 against rotation when the instrument is not in use.

A bull's-eye type level 66 is mounted in the compass case 5 for the purpose of ensuring that the instrument is held level and to ensure a horizontal line or bearing for a strike determination.

Having now described the compass mechanism in detail, the use and operation of the instrument will now be described.

Declination setting

The declination setting is turned off by rotating handle 30 upward. This will raise entire compass dial and magnet bars assembly off pivot and force flat top of cylinder 18 into friction contact with friction disk 14. This will also engage gear 32 and ring gear 28. When shaft 38 is turned by means of knife point or small screw driver engaged with wheel 33, the ring gear 28 rotates magnet bar assembly relative to compass card 22 which is kept stationary by friction disk 14 and upward pressure of cams 29 on bottom of cylinder 18. This means moving the magnet rods in relation to the dial so that true bearings will be read in the scribed magnifying lens 41. The actual declination settting is obtained by turning shaft 38 until the pointer 26 is moved left or right with respect to the 0° mark on the dial 11 so as to correspond with the predetermined magnetic declination for the area in which the compass is to be used. If desired, the instrument can be used for giving bearings relative to magnetic instead of true North by leaving the pointer 26 and therefore the magnetic rods coincident with the 0° or North setting of the dial. In FIG. 1, the declination setting shown is for a west declination of about 5 degrees. In FIG. 3 for simplicity in drawing presentation, the magnet rod assembly is shown at 90° to 0° point on dial or the equivalent of 90° declination. This is, of course, much higher than magnetic declination anywhere on the globe. FIG. 3 then shows a declination selected only for simplicity of drafting and for presentation of method of operation of declination setting system.

*To determine a bearing.*—Hold compass level in hand, waist high, look in mirror on cover and align black line 63 in centre of mirror with centre of forward sighting vane aperture 46. When object, vane and mirror centre line are coincident read off bearing on dial 11. The arrow present in the magnet assembly is only for indicating declination angle. This will be the bearing to the object. The slanted dial immediately in front of the observer eliminates parallelax and the liquid-damping will bring the dial 11 to rest quickly.

An alternative method for accurate sighting is to put the instrument at eye level and look through the rear sighting window 62–64 and line up the station or object, whose bearing is to be determined, with the forward sighting vane and the line 63 in the rear window. Then looking through this window, read the bearing from the dial 11. This method is particularly useful for positive vertical angle shots. For negative angle shots use the rear sighting vane 49 with the compass case cover at right angles to the body of the instrument and sighting through the forward sighting vane read off the bearing from the dial 11.

*To determine strikes or bearings rapidly.*—Hold compass level in hand, waist high, as the dial 11 swings freely, roughly align forward vane 45 and central axis of compass parallel to line of strike or bearing to be determined. Read bearing directly from dial 11 facing observer.

*To set off and follow predetermined cover or bearing.*—Turn ring 43 so that desired azimuth or bearing is coincident with central axis of compass marked on case near the hinge of forward sighting vane. Turn compass, chest or waist high, and body until body and compass are pointing in the desred drection as indicated by reading desired bearing in dial 11 below the desired bearing set off on ring 43. Line up a tree, bush etc., with forward vane and walk toward object. Repeat procedure when selected object is reached by another sight on same bearing with same procedure.

*To follow a pre-determined course at night.*—Turn ring 43 so that desired bearing is coincident with central axis line marked on case near the hinge of forward sighting vane. Turn compass, chest high and body until azimuth of desired bearing is indicated by coincidence of the luminescent mark at 0° of ring 43 and the luminous mark of 0° or North point of the dial 11. Proceed in the direction indicated by luminous points 48 on forward vane and keep the two luminescent marks coincident while moving by frequent observations.

*To determine inclination of planes or "dips" of geological features.*—Turn compass on edge i.e. the axis of the compass dial will be horizontal. Put instrument edge parallel to plane to be measured. Release clinometer clamp 65 with finger. When clinometer settles, clamp again and read angle in clinometer window 60.

*To determine horizontal or vertical angles.*—Open the small hinge mirror 61 and turn to position indicated by dotted lines in FIG. 2. Turn rear sighting vane 49 to right angles to case, also turn forward sighting vane 45 to 90° (approximate) to case. Turn instrument edgewise and sight to object through rear vane 49 over top of small mirror and through slot 46 in forward sighting vane. The purpose of the small mirror is to determine when card 57 is at rest. Release clinometer clamp 65. When card 57 is at rest clamp card. Read vertical angle from clinometer card 57 in window 60.

*To use as a hand level.*—Rotate instrument about a horizontal axis until clinometer window 60 shows 0° under window line as seen in small mirror sight 61 over mirror edge and through slot 46 in forward vane 45, mark or observe point in horizontal line of sight.

The instrument is designed to be light, small and compact enough to be carried on a cord around the neck, in a pocket of a shirt; in pant's pocket or a small specially designed leather belt container or case.

Having described construction and use of this instrument, I desire it understood that variations in the construction and arrangement of the parts thereof may be resorted to within the spirit of the invention as set forth in the following claims. Two such variations possible could be slight variations in mechanism for turning of the magnetic declination and in the angle of compass dial. It is shown in FIGS. 2 and 3 as at 45°. This may be changed to vertical or horizontal and still remain within the spirit of the invention.

What I claim is:

1. A hand or tripod held pocket magnetic surveying compass-clinometer instrument comprising a compass case and a clinometer case hingedly connected together for closure with each other, a central axis mark on said compass case, a compass within said compass case, the said compass comprising a liquid tight container of transparent material filled with a compass dampening liquid, a rotatable graduated ring in said compass case located about the periphery of the said container, a pivot member centrally located in said container, a first cylindrical sleeve axially located about said pivot member, the said sleeve having a jewel pivot bearing at its upper end for engagement with the said pivot member, a graduated compass dial axially mounted on said first cylindrical sleeve, the said rotatable graduated ring adapted to be oriented with the said compass dial when the said compass dial is rotated to a desired orientation, a second sleeve rotatably mounted about said first cylindrical sleeve and movable axially thereon, a magnet assembly mounted on said second sleeve co-axial with said pivot member and compass dial, means accessible from without the said compass case to elevate and disengage the said compass dial and magnet assembly from said pivot member and to non-rotatably engage the said first cylindrical sleeve and compass dial with the said container, means accessible from without said compass case to rotate the said second sleeve and magnet assembly relative to said first cylindrical sleeve and compass dial when the said first cylindrical sleeve and compass dial are elevated and engaged with the said container, a weighted clinometer in said clinometer case, and sighting means on said compass case and clinometer case and aligned when the said central axis mark on said compass case when the said compass case and clinometer case are in the opened position and in a common plane with respect to each other, the said sighting means including a mirror in which is viewed for direct reading the movement of said weighted clinometer.

2. A compass as set forth in claim 1, in which the said compass dial is an inverted frustrum of a cone and the said fluid container has a surface parallel with the surface of the dial through which the dial is visible.

3. A compass as set forth in claim 1, in which the magnet assembly includes a sleeve rotatable about the said cylindrical sleeve supports, a pair of bar magnets disposed parallel with each other, one on either side of said sleeve, and a pointer is mounted on the said assembly central and parallel with the said bar magnets.

4. A compass as set forth in claim 1, in which the means to elevate the said compass dial and magnet assembly includes a shaft, means to rotate the shaft, and a pair of cams on the said shaft, the said cams being located one on either side of the said pivot member below and contacting said first and second sleeves.

5. A compass as set forth in claim 1, in which the said second sleeve includes a ring gear and pinion means rotatable by means operable from without the compass case when the said compass and magnet assembly is elevated.

6. A compass as set forth in claim 5, in which the means to operate the said ring gear includes a gear train.

7. A compass as set forth in claim 6, in which the magnet and dial assembly is disengaged from the said gear train when the magnet and dial assembly is resting on and rotatable on the pivot member.

8. A compass as set forth in claim 1, in which the said magnet assembly is rotatable independently of the said compass dial when the said magnet assembly and compass dial are raised off the said pivot member.

9. A compass as set forth in claim 1, in which the said clinometer includes a small mirror hingedly arranged on the case so that said mirror when set at an angle to the plane of the clinometer permits reading of the said clinometer and alignment with the said sighting means simultaneously.

References Cited by the Examiner

UNITED STATES PATENTS

| 43,036 | 6/64 | Martin | 33—224 |
|---|---|---|---|
| 709,046 | 9/02 | Rueger | 33—72 |
| 1,042,079 | 10/12 | Brunton | 33—72 X |
| 1,474,394 | 11/23 | Warburg | 33—72 |
| 2,118,082 | 5/38 | Hammond | 33—222 |
| 2,127,807 | 8/38 | Carbonara | 33—222 X |

FOREIGN PATENTS

| 135,014 | 11/19 | Great Britain. |
|---|---|---|
| 96,752 | 9/39 | Sweden. |

ISAAC LISANN, *Primary Examiner.*